W. E. FRAZEE.
NUT LOCK.
APPLICATION FILED OCT. 28, 1908.
934,805.
Patented Sept. 21, 1909.
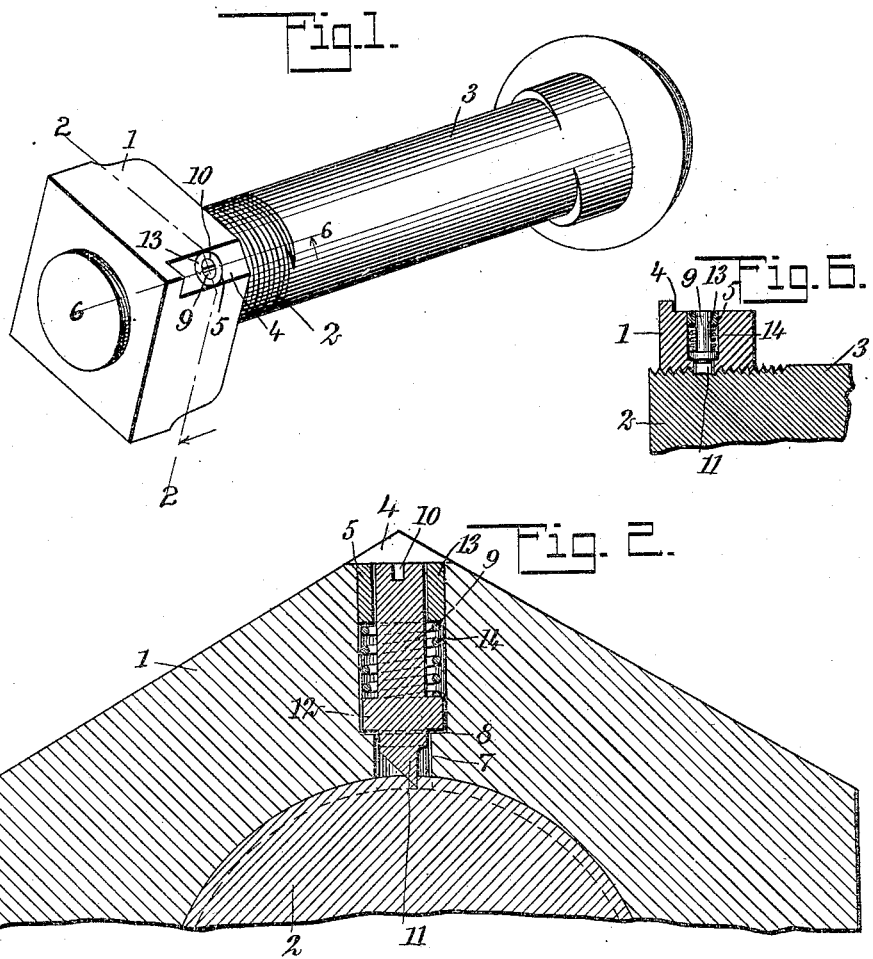
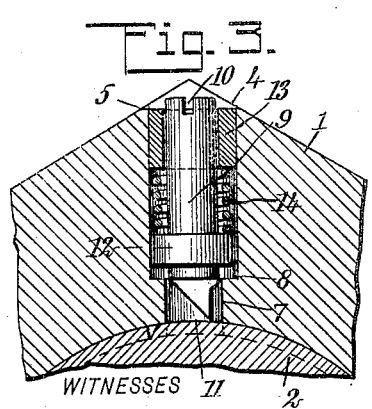
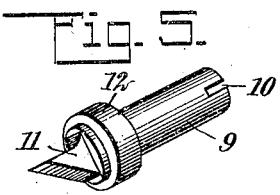
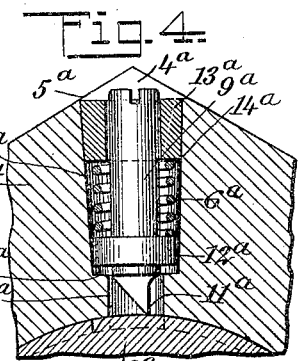
WITNESSES
L. Almquist
Oswald Munn
INVENTOR
Willis E. Frazee
BY Munn & Co.
ATTORNEYS

UNITED STATES PATENT OFFICE.

WILLIS EDGAR FRAZEE, OF PERHAM, MINNESOTA.

NUT-LOCK.

934,805.

Specification of Letters Patent. Patented Sept. 21, 1909.

Application filed October 28, 1908. Serial No. 459,868.

*To all whom it may concern:*

Be it known that I, WILLIS EDGAR FRAZEE, a citizen of the United States, and a resident of Perham, in the county of Ottertail and State of Minnesota, have invented a new and Improved Nut-Lock, of which the following is a full, clear, and exact description.

This invention relates to nut locks, and more particularly such as are adapted to ride on the threads of a bolt until it is desired to lock the nut in place, and each of which in general consists of a rotatable locking member located in an opening in the nut and having a chisel edge adapted to engage the threads of the bolt, resilient means within the opening of the nut for holding the chisel edge normally in engagement with the bolt threads, and a bushing securing the locking member in place, the latter projecting beyond the bushing so that it can be struck by a tool to force the chisel edge into engagement with the threads of the bolt to lock the nut firmly in place.

The object of the invention is to provide a device of the class described, simple and efficient in construction and inexpensive to manufacture, which will effectively lock a nut in place on the shank of a bolt against accidental displacement, and which can be readily loosened by hand if desired.

Reference is to be had to the accompanying drawings forming a part of this specification, in which similar characters of reference indicate corresponding parts in all the views.

Figure 1 is a perspective view of an embodiment of my invention, applied to a bolt nut; Fig. 2 is an enlarged cross section, on the line 2—2 of Fig. 1; Fig. 3 is a similar view, showing the locking member in the normal position resting on one of the threads of the bolt; Fig. 4 is a similar view of a modified construction, showing the locking member in a turned position, so that it will ride on the threads of the bolt; Fig. 5 is an enlarged perspective view of the locking member, and Fig. 6 is a longitudinal section on the line 6—6 of Fig. 1.

In the specific form shown in the drawings, I provide a threaded nut 1 of any common or preferred form, which is adapted to be removably received by a correspondingly threaded end 2 of a bolt 3. The nut has a cut-away portion 4 preferably located at one of its corners and at which is situated an opening 5 which extends through to the inside of the nut. This opening has a constricted portion 7. At the juncture of these two portions an annular shoulder 8 is formed, for a purpose to be hereinafter described.

Adapted to be removably arranged in the opening 5 is a locking member or dog 9, the latter having its upper end provided with a groove 10 adapted to receive a tool, so that the member may be rotated in the opening, and having its lower end 11 chisel-shaped.

Carried on the locking member and near the lower end thereof is a guide-collar 12. Adapted to fit into the upper end of the opening is a bushing 13, which serves to hold the locking member in place. Arranged between the bushing 13 and the collar 12 and encircling the locking member is a helical spring 14, the latter operating to hold the end 11 of the locking member in engagement with the threads of the bolt.

In the operation of the device, the end 11 of the locking member rides on top of the threads of the bolt, as shown most clearly in Fig. 3, the outer end of the member projecting beyond the bushing. When it is desired to lock the nut in place, this end of the member which extends beyond the bushing, is struck by some suitable tool, and the chisel-shaped end 11 is driven into the thread, as shown most clearly in Fig. 2. The shape of the end 11 of the member allows the nut to be rotated in one direction, the end coming out of the notch which it has made in the thread by itself. Further, when it is necessary to screw the nut in the opposite direction, the outer end of the locking member may be manually held until it has passed the notch which has been made. The device is further constructed so that if desirable, the locking member may be turned so that the end 11 will either ride between the threads or on top of them, as shown most clearly in Fig. 4 of the drawings.

The shoulder 8 formed in the opening 5 serves to limit the projection of the lower end 11 of the locking member, as the latter is driven into engagement with the bolt thread.

In the modified form shown in Fig. 4, I have provided a nut 1ª, cut away at 4ª and having an opening 5ª, the latter being provided with a portion 6ª which is inwardly tapered and which terminates in a constricted portion 7ª. At the juncture of these portions an annular shoulder 8ª is formed. Arranged in the opening 5ª is a locking member 9ª, having its lower end 11ª chisel-shaped, for engaging the threads of the bolt 2ª. The locking member is further provided with a tapered collar 12ª, which serves to guide it in the opening 5ª. Adapted to fit into the upper end of the opening 5ª is a tapered bushing 13ª, which serves to hold the locking member in place.

The tapered opening in Fig. 4 permits the locking member to be locked frictionally in position, the periphery of the collar which is also tapered being jammed against the inner wall of the opening when the locking member is driven into locking position.

Having thus described my invention, I claim as new and desire to secure by Letters Patent:

1. In a device of the class described, a nut having a tapered opening extending therethrough and having its lower portion constricted, a locking member movably arranged in said opening and having its lower end chisel-shaped and adapted normally to ride on the threads of a bolt, a tapered collar rigid with said member and serving to guide the same, a tapered bushing located at the upper end of said opening, and a helical spring arranged about said locking member for holding the same in engagement with the threads of the bolt, said member normally projecting beyond said bushing, whereby it can be struck by a tool to force the lower end thereof into the bolt thread to lock said nut in place, said constricted portion of the opening serving to limit the movement of said member by its engagement with said collar.

2. In a device of the class described, a nut having an opening extending transversely thereof from its outer face to its inner, said opening being constricted adjacent to the bolt opening, a locking member slidable in the opening and having its lower end chisel-shaped and beveled on one side to ride on the threads of the bolt, a collar rigid with the locking member, a bushing at the outer end of the opening, a spring between the bushing and the collar, the outer end of the locking member being provided with a kerf or notch for the purpose set forth.

In testimony whereof I have signed my name to this specification in the presence of two subscribing witnesses.

WILLIS EDGAR FRAZEE.

Witnesses:
ALBERT C. JEROME,
JOHN FRYER.